United States Patent [19]
Nilsson

[11] Patent Number: 5,858,071
[45] Date of Patent: Jan. 12, 1999

[54] WATER-PURIFYING APPARATUS

[75] Inventor: Bror Nilsson, Svedala, Sweden

[73] Assignee: Libradon AB, Svedala, Sweden

[21] Appl. No.: 750,941

[22] PCT Filed: Aug. 18, 1995

[86] PCT No.: PCT/SE95/00940

§ 371 Date: Feb. 11, 1997

§ 102(e) Date: Feb. 11, 1997

[87] PCT Pub. No.: WO96/06044

PCT Pub. Date: Feb. 29, 1996

[30] Foreign Application Priority Data

Aug. 19, 1994 [SE] Sweden .................................. 9402780
Oct. 24, 1994 [SE] Sweden .................................. 9403643

[51] Int. Cl.$^6$ ................................................ B01D 19/00
[52] U.S. Cl. ................................ 96/170; 55/340; 95/262; 96/206; 96/220
[58] Field of Search ........................... 95/241, 260, 262; 96/170, 157, 204, 206, 220; 55/338, 339, 340

[56] References Cited

U.S. PATENT DOCUMENTS

| | | | |
|---|---|---|---|
| Re. 35,074 | 10/1995 | Lamarre ..................................... | 95/263 |
| 1,592,647 | 7/1926 | Speller ...................................... | 96/206 |
| 3,940,471 | 2/1976 | Favre ........................................ | 95/127 |
| 4,023,941 | 5/1977 | Miller ....................................... | 96/170 |
| 4,371,383 | 2/1983 | Rost .......................................... | 55/169 |
| 4,582,610 | 4/1986 | Baker .................................... | 261/119.1 |
| 4,756,724 | 7/1988 | Yuill ......................................... | 96/218 |
| 5,100,555 | 3/1992 | Matson .......................................... | 96/6 |
| 5,104,554 | 4/1992 | Dempsey ................................. | 210/747 |
| 5,279,746 | 1/1994 | Ziol .......................................... | 95/159 |
| 5,614,086 | 3/1997 | Hill et al. ................................... | 95/245 |
| 5,660,721 | 8/1997 | Kyriss et al. .............................. | 96/157 |

FOREIGN PATENT DOCUMENTS

| | | | |
|---|---|---|---|
| 550998 | 2/1943 | United Kingdom .................... | 96/170 |
| 8904565 | 4/1990 | WIPO . | |

OTHER PUBLICATIONS

Jerry D. Lowry et al.; "Point–of–Entry Removal of Radon From Drinking Water"; pp. 162–169; American Water Works Association Journal, vol. 79, No. 4, 1987.

Primary Examiner—Duane S. Smith
Attorney, Agent, or Firm—Marshall & Melhorn

[57] ABSTRACT

A water-purifying apparatus, for reducing the radon content of radon-contaminated water, includes a reactor tank for treating the radon-contaminated water, a radon-releasing structure arranged in the upper part of the reactor tank to receive water from a first pump adapted to supply water from a source of water containing radon-contaminated water, the water from the radon-releasing structure accumulating in the reactor tank, an inlet duct extending between the first pump and the radon-releasing structure, an outlet duct from the reactor tank, the outlet duct being connected to a water consumption system, and a radon-gas outlet from the reactor tank. In a mixing structure, water from the first pump is mixed with water from the reactor tank with the aid of a second pump in order to produce such a water flow in the radon-releasing structure as results in effective radon release. The radon-releasing structure is in air communication with the surroundings of the reactor tank, so that air, via this air communication, is entrained with the water, which is supplied to the radon-releasing structure via the mixing structure, with a view to admixing air with the water and, hence, releasing the radon.

9 Claims, 3 Drawing Sheets

WATER-PURIFYING APPARATUS

BACKGROUND OF THE INVENTION

This invention relates to a water-purifying apparatus, which is especially adapted to reduce the radon content of radon-contaminated water and which comprises a reactor tank for treating the radon-contaminated water, a radon-releasing means arranged in the reactor tank to receive and treat water from a first pump adapted to supply water from a source of water containing radon-contaminated water, the water from the radon-releasing means accumulating in the reactor tank, an inlet duct extending between the first pump and the radon-releasing means, an outlet duct from the reactor tank, said outlet duct being connected to a water consumption system, and a radon-gas outlet from the reactor tank.

U.S. Pat. No. 4,371,383 teaches a radon-removal system intended to be arranged between a source of water and a pressure storage tank. According to the US specification, this system succeeds in removing 80–90% of the radon by aerating the water, but nevertheless does not possess the efficiency required to achieve results below the Swedish maximum permissible value of 500 Bq/l, if the contaminated water has a radon content of 5000 Bq/l or more.

SE 464,712 discloses a water-purifying apparatus which effectively removes, inter alia, iron and manganese from water. The Swedish technique is based on effective aeration of the water, a technique that has proved to be useful also when it comes to removing radon. However, radon-contaminated wells are often fairly deep (70–100 m), which means that the amount of water lifted is rather small, for instance 5 l/min. A much greater flow rate of at least 25 l/min is required for effective aeration of the water. When the flow rate is too small, the aeration is less effective, which of course has an adverse effect on the removal of radon.

SUMMARY OF THE INVENTION

The main object of this invention is to obviate the inconveniences of the prior-art radon-removal system by providing a water-purifying apparatus for separating radon from water, which is equally effective regardless of the amount of water supplied by the well pump.

Another object of the invention is to provide a water-purifying apparatus that does not take up much space and is easy to set up.

According to the invention, these objects are achieved by an apparatus which is of the type described by way of introduction and whose distinctive features are recited in the characterising clauses of the appended claims.

The water-purifying apparatus according to the invention has the advantage of being inexpensive to set up. Since it can be adapted to all types of wells as well as to the amount of water supplied from each well, the water-purifying apparatus can be set up between an existing pump and the pressure storage tank normally provided. Neither the pump nor any other equipment need be exchanged.

BRIEF DESCRIPTION OF THE DRAWINGS

A few embodiments of the invention will now be described in more detail with reference to the accompanying drawings, in which.

DETAILED DESCRIPTION

Figure 1:
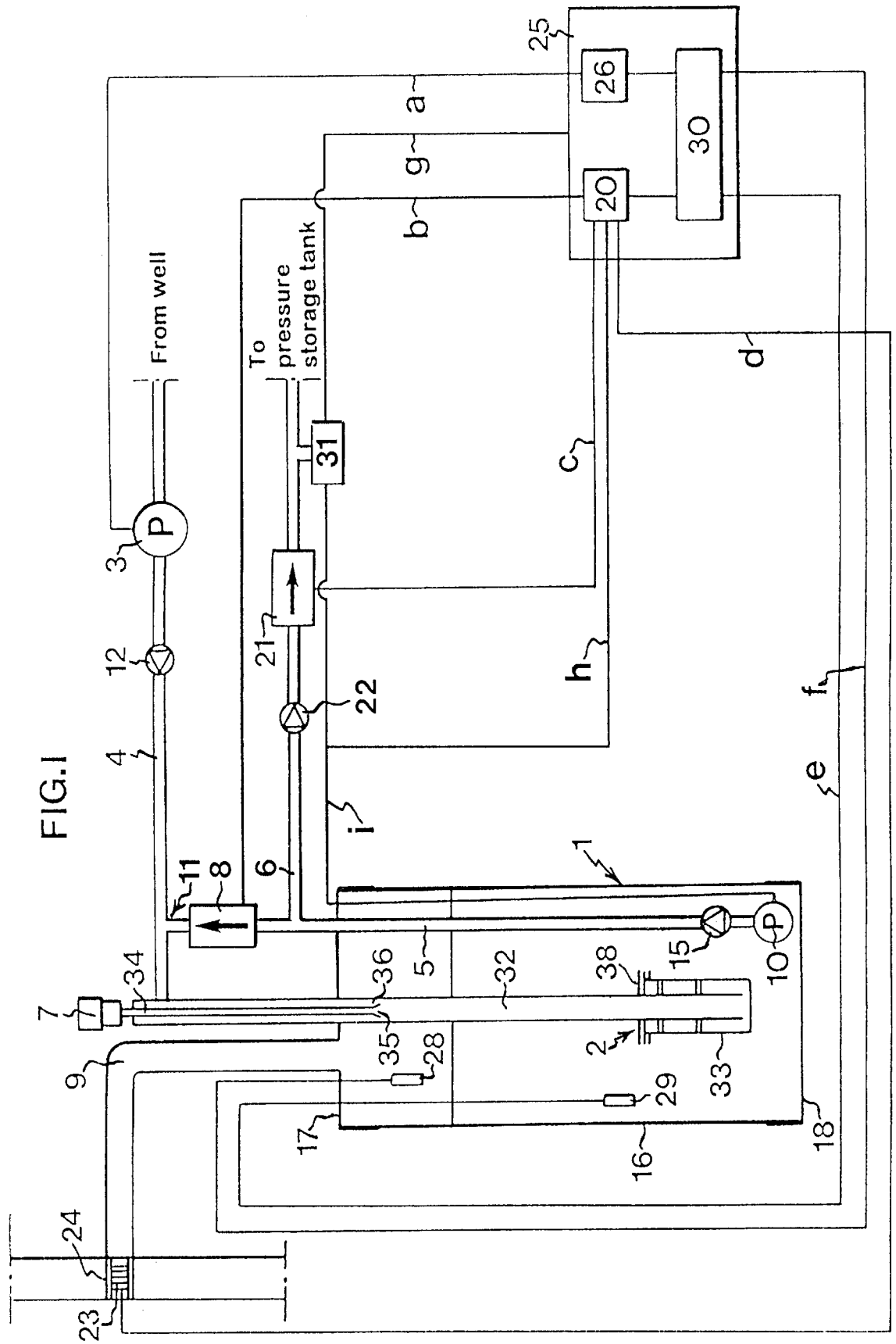
FIG. 1 is a schematic view of a first embodiment of the radon-separating apparatus according to the invention.

Thus, FIG. 1 shows a water-purifying apparatus or radon-separating apparatus according to the invention. This radon-separating apparatus comprises a reactor tank 1, the construction of which will be described in more detail below. A radon-releasing means 2 is mounted in the reactor tank. An inlet duct 4 extends between a well containing radon-contaminated water and the radon-releasing means. A well pump 3 is connected in the inlet duct, and a combined circulation/outlet pump 10 is arranged in the tank and connected to the inlet duct by means of a duct 5, a solenoid valve 8 which is closed in the absence of current, and a T-joint 11. Normally, the first pump or well pump 3 is a 380-V pump, whereas the second pump 10 is a 220-V submersible drainage pump having a capacity of approximately 150 l/min. The duct 5 is equipped with a non-return valve 15 preventing radon-contaminated water from being, by the well pump 3, pressed directly into the reactor tank via the pump 10. Also the duct 4 is equipped with a non-return valve 12 preventing water from flowing backwards therein towards the pump 3. The pumps 3 and 10 are so dimensioned that the pump 3 provides a higher pressure than does the pump 10, thus ensuring that the water from the well is at all times supplied to the radon-releasing means. Furthermore, the pump 10 is connected to a pressure storage tank for receiving radon-free water from the reactor tank via a duct 6, which is connected to the duct 5 between the solenoid valve 8 and the non-return valve 15 and which has a non-return valve 22 and a solenoid valve 21, which is open in the absence of current. A pressure switch 31 is connected to the duct 6 and adapted to sense the pressure in the pressure storage tank.

The radon-releasing means 2 comprises a water pipe 32, which is connected to the inlet duct 4 and extends into the reactor tank 1, thus opening into a treatment container 33. The treatment container is open upwards, and its opening is covered by a pair of loose plates 38.

An air suction pipe 34, which is provided inside the water pipe, has a first end, which is in communication with the surrounding atmosphere outside the reactor tank, and a second, conically widened end 35, which is located in the water pipe 32. The widened end is at all times located above the highest possible water level in the tank 1. Between the inner wall of the water pipe and the conical end 35 is formed a narrow, annular gap 36, through which the water flows. The velocity of the water increases when it passes through the annular gap 36 and disintegrates to droplets, which are mixed with the air flowing in through the air suction pipe 34. The air is sucked in via a vacuum valve 7 provided at the first end of the air suction pipe. This valve 7 prevents the radon gas from flowing back out through the air suction pipe 34. The mixture is caused to flow down to the bottom of the treatment container 33 and between the wall of this container and the water pipe, so as to impinge upon the plates 38. The treated water flows out of the treatment container "in the shape of an umbrella". Thus, the radon found in the water can be effectively converted to radon gas, which is withdrawn from the reactor tank via an outlet 9, which consists of a tube extending to the closest outer wall of the compartment in which the radon-separating apparatus is arranged. For instance, use is made of a valve 24 arranged in the wall.

Conveniently, a fan 23 is set up in the valve, in order to ensure that the radon gas is fed out of the reactor tank. Even without the fan, the radon gas will, as a rule, be withdrawn from the reactor tank owing to the positive pressure created when the radon is released. It should be pointed out that the reactor tank has approximately atmospheric pressure.

FIG. 1 shows a case where the water level in the reactor tank is located between two level sensors 28 and 29 which, via electric lines f and e, respectively, are connected to a level-sensor relay 30 on a control panel 25. In addition, the control panel 25 comprises a contactor 26 and a time lag relay 20, which are controlled by the level-sensor relay. The solenoid valves 8 and 21 as well as the fan 23 are connected to the time lag relay by means of connecting lines b, c and d, respectively. The well pump 3 is connected to the contactor by means of a line a. The pump 10 is actuated with the aid of the control panel 25 via a line g, in which the pressure switch 31 is electrically connected, and a line i or from the level-sensor relay 20 via a line h and the line i.

Being arranged at the bottom of the tank, the pump 10 will draw up any sludge, such as iron and manganese, that has been precipitated upon the aeration in the radon-releasing means 2.

The water-purifying apparatus according to the invention operates as follows.

1. Assuming that the water level in the reactor tank 1 in an initial position is located between the level sensors 28 and 29 and that the pressure in the pressure storage tank is identical with an upper, adjustable limit pressure, for instance 4 kg. The level-sensor relay 30 is inactive, and no current is fed to the time lag relay 20 or the contactor 26. The pressure switch senses the upper limit pressure in the pressure storage tank and maintains the line g to the pump 10 broken.

2. Water is withdrawn from the pressure storage tank, which reduces the pressure in the duct 6. The pressure switch closes, and current is fed to the pump 10, which pumps radon-separated water from the reactor tank to the pressure storage tank, until the pressure in the pressure storage tank attains the upper limit pressure, whereupon the pump is switched off.

3. When the water level in the reactor tank has sunk below the level sensor 29, the level-sensor relay 30 is operated and feeds current to the pump 3 via the contactor 26 and the line a, as well as to the pump 10, the solenoid valves 8 and 21 and the fan 23 via the time lag relay 20 and the respective lines h, i; b; c and d. The solenoid valve 8 opens, and the solenoid valve 21 closes, thus preventing water from the reactor tank from being pumped into the pressure storage tank during the radon release process, which otherwise might happen if the pressure in the pressure storage tank falls below the pressure in the duct 5. The pump 3 supplies water to the reactor tank until the water level again reaches the level sensor 28. At the same time, the pump 10 circulates the reactor-tank water back to the inlet duct 4 via the T-joint 11 in order to mix it with the well water, thereby to produce a sufficient water flow through the radon-releasing means 2 and, hence, achieve effective radon release.

4. When the water level has reached the level sensor 28, the relay 30 is released and interrupts the current to the pump 3. The time lag relay is, on the contrary, maintained in operated state during a set time lag period after the level-sensor relay has been released. The pump 10 may thus continue to circulate the water in the reactor tank in order to promote the radon release. When the set time lag period has come to an end, the time lag relay is released, and the solenoid valve 8 closes and the solenoid valve 21 opens. Furthermore, the fan 23 is switched off. If the pressure in the pressure storage tank is identical with the upper limit pressure, also the pump 10 is switched off. Otherwise, the pump 10 pumps water to the pressure storage tank until the limit pressure has been attained.

According to the invention, the reactor tank 1 is made up of a plastic tube 16, which is cut to suitable length, depending on the aimed-at reactor tank volume. A bottom lid 18 is glued to the bottom end of the tube, and threaded holes are made in the top lid 17 for the water duct 5, the water pipe 32, the level sensors 28 and 29 and the radon-gas outlet 9. Also the top lid can be glued to the tube, but it may be convenient to dispense with the gluing, thus enabling the reactor tank to be opened for service purposes.

Figure 2:
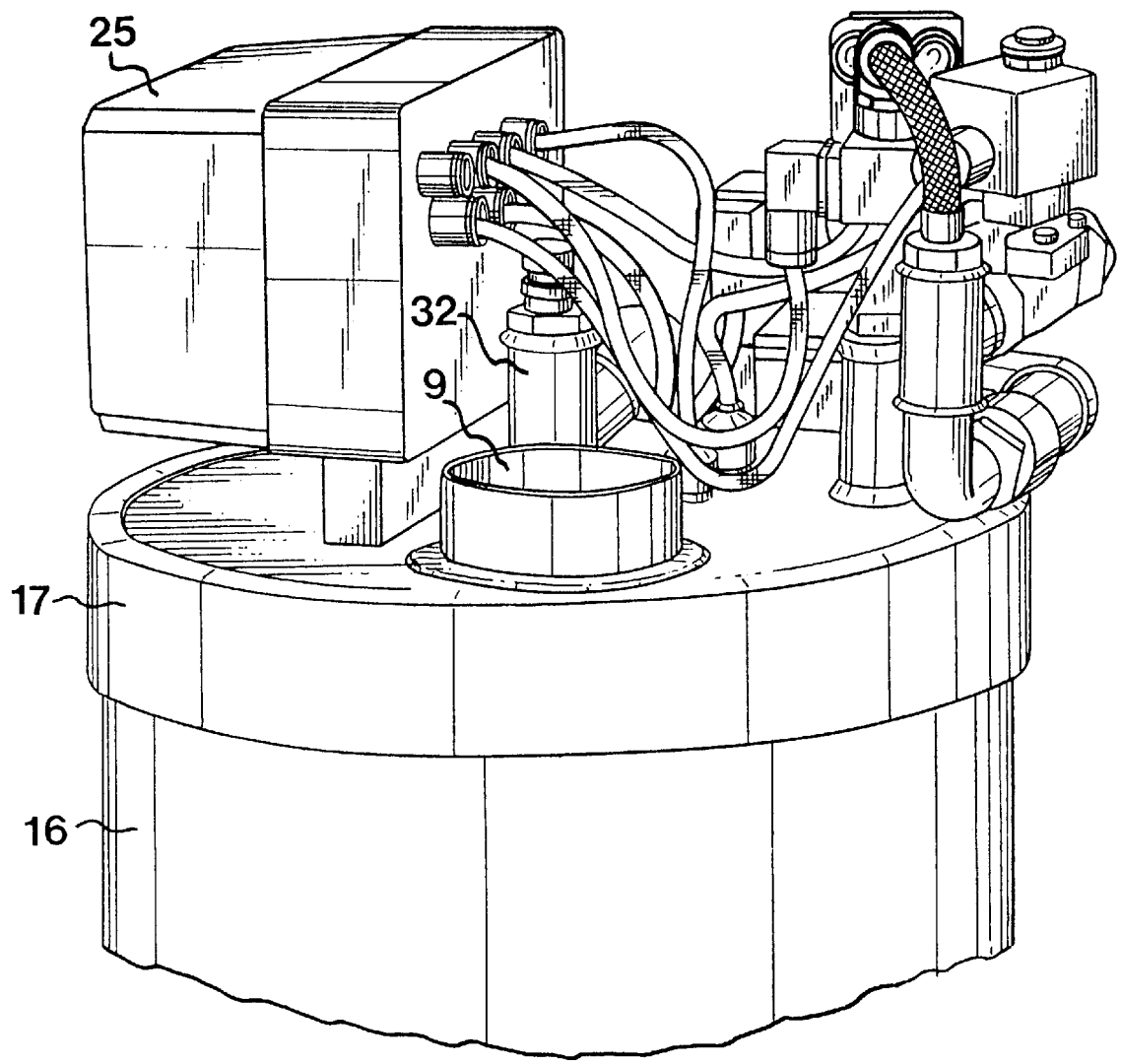
FIG. 2 is a perspective view of the upper part of the radon-separating apparatus according to the invention, illustrating how various components can be mounted on the lid of the tank.

By arranging the pump 10 inside the reactor tank 1, providing all the holes for various components in the lid 17, and mounting the control panel 25 on top of the lid, as shown in FIG. 2, one obtains a compact unit which is easy to transport, takes up a minimum of space when set up, and in addition is easy to set up.

Figure 3:
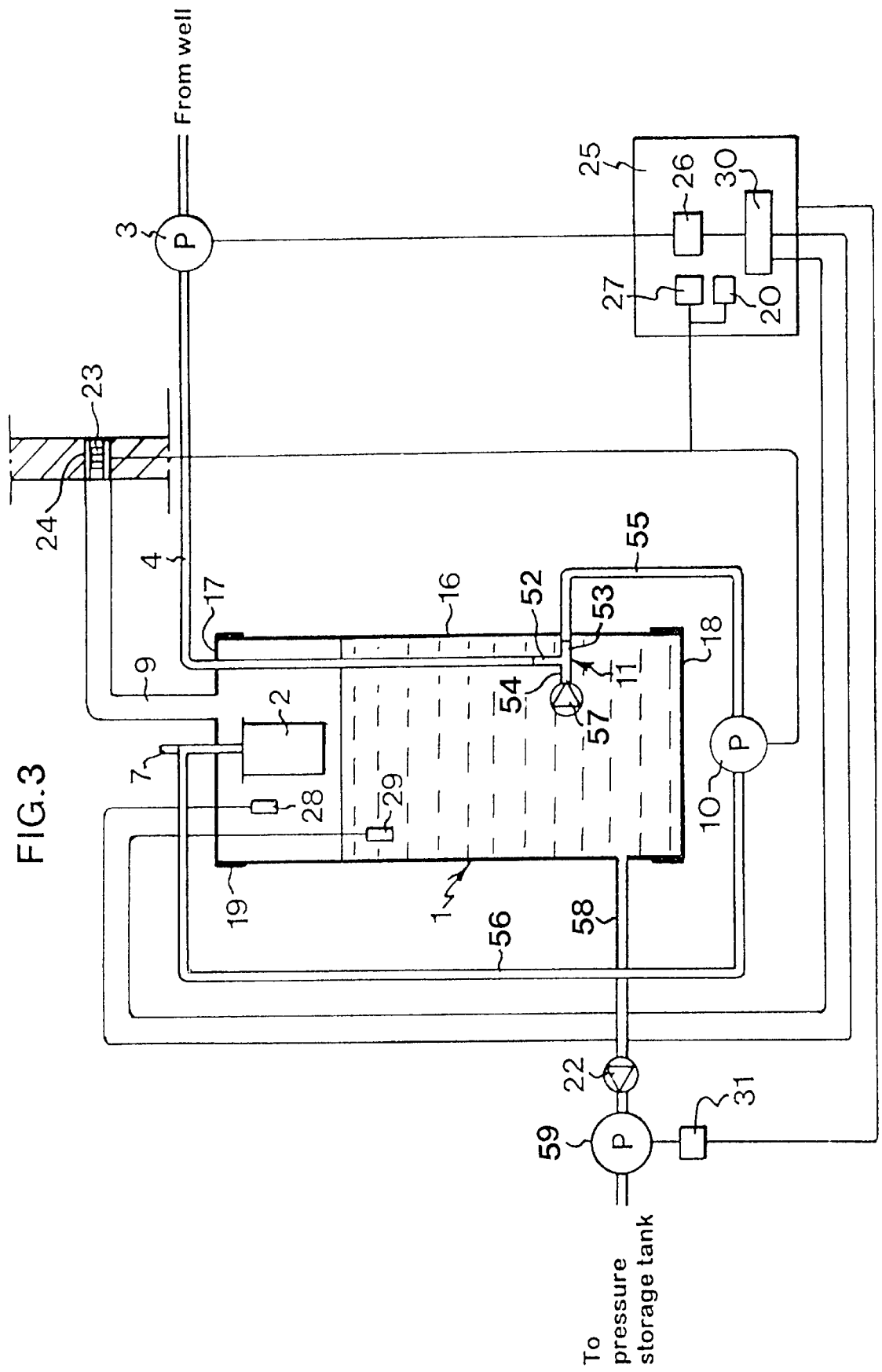
FIG. 3 is a schematic view of a second embodiment of the radon-separating apparatus according to the invention.

FIG. 3 illustrates a second embodiment of the radon-separating apparatus according to the invention. Like components of the two embodiments have been given like reference numbers. The radon-separating apparatus thus comprises a reactor tank 1, in the upper part of which is mounted a radon-releasing means 2. An inlet duct 4, 55, 56 extends from a well containing radon-contaminated water to the radon-releasing means. The first pump or well pump 3 is connected in the inlet duct, and the second pump 10 is connected in the inlet duct between the well pump 3 and the radon-releasing means 2. The inlet-duct portion 4 partly extends into the reactor tank. Between the duct portions 4 and 55, the T-joint 11 is connected via its connections 52 and 53. The connection 53 is connected to the suction side of the pump 10, while the connection 52 is connected to the delivery side of the pump 3. The T-joint is disposed inside the reactor tank on a level which at all times is located below the water level when the radon-separating apparatus is in operation. The third connection 54 is provided with a non-return valve 57, enabling water to be drawn from the reactor tank into the duct portion 55, but preventing radon-contaminated water from being pressed directly into the reactor tank via the connection 54 by means of the well pump 3. It should be emphasised that the entire inlet duct can be arranged outside the reactor tank, in which case only the connection 54 is inserted in the tank.

An outlet duct 58 is connected to the bottom part of the reactor tank, and a 220-V pump 59 is connected in the outlet duct. The delivery side of the pump is preferably connected to a pressure storage tank, where radon-free water is collected for future consumption. The pump 59 is controlled by a pressure switch 31 which, at a predetermined lower pressure on the delivery side of the pump, allows current to be fed to the motor of the pump and which, at a predetermined higher pressure, interrupts the current being fed. A non-return valve 22 is connected in the outlet duct 58 between the pump 59 and the reactor tank 1.

The radon-separating apparatus illustrated in FIG. 3 operates as follows. It is assumed that the reactor tank 1 is filled to the level indicated in FIG. 1. When the pressure in the pressure storage tank and, hence, the pressure on the delivery side of the pump 59 have sunk to a predetermined level, the pressure switch 31 allows the pump 59 to be actuated. The pump 59 then draws water from the reactor tank 1 in order to replenish the pressure storage tank. When the water level in the reactor tank has sunk below the level sensor 29, the level-sensor relay 30 will transmit a signal to the main contactor 26 in order to actuate the pump 3 and, via an auxiliary contactor 27, actuate the fan 23 and the pump 10. The pump 10 draws water from the duct portion 55 and presses this water into the radon-releasing means 2. The pump 10 always draws about 25 l/min and, since the pump 3 normally does not deliver such amounts of water, the pump 10 draws the remainder from the reactor tank via the non-return valve 57. Thus, the pump always presses about 25 l/min through the duct portion 6 into the radon-releasing means 2. When the water level in the reactor tank has risen to the upper level sensor 28, the level-sensor relay 30 will deactivate the pumps 3 and 10 as well as the fan 23 via the main contactor 26 and the auxiliary contactor 27. In the event that a time lag relay 20 is set at a time lag period, the pump 10 and the fan 23 will remain active during this period, so as to circulate the water in the reactor tank and draw any additional released radon gas therefrom.

Even though the invention has been described in connection with radon removal from water, it goes without saying that the invention is applicable to any water-purifying purifying apparatus whatsoever, for instance when iron, manganese and hydrogen sulphide are to be removed and use is made of a means equivalent to the radon-releasing means. It may, in this context, be convenient to arrange a sand filter after the pressure storage tank.

I claim:

1. A water-purifying apparatus for reducing the radon content of radon-contaminated water and which comprises a reactor tank for treating the radon-contaminated water, a radon-releasing means arranged in the reactor tank to receive and treat water from a first pump adapted to supply water from a source of water containing radon-contaminated water, the water from the radon-releasing means accumulating in the reactor tank, an inlet duct extending between the first pump and the radon-releasing means, an outlet duct from the reactor tank, said outlet duct being connected to a water consumption system, and a radon-gas outlet from the reactor tank, characterized in that there is provided a mixing means, in which water from the first pump is mixed with water from the reactor tank with the aid of a second pump in order to produce such a water flow in the radon-releasing means as results in effective radon release, and that the radon-releasing means is in air communication with the surroundings of the reactor tank, so that air is, via said air communication, entrained with the water, which is supplied to the radon-releasing means via the mixing means, with a view to admixing air with the water and, hence releasing the radon.

2. A water-purifying apparatus as set forth in claim 1, characterized in that the mixing means is a T-joint.

3. A water-purifying apparatus as set forth in claim 1 characterized in that the second pump is located inside the reactor tank.

4. A water-purifying apparatus as set forth in claim 1, characterized in that the second pump is arranged to draw water close to the bottom of the reactor tank in order to remove any solid particles that have been precipitated upon the treatment in the radon-releasing means.

5. A water-purifying apparatus as set forth in claim 1, characterized in that the second pump is connected to the outlet duct, and that valve means are arranged to guide the flow from the second pump alternately to the mixing means and to the water consumption system.

6. A water-purifying apparatus as set forth in claim 5, characterized in that a first valve means is arranged in a duct extending between the second pump and the mixing means, and that a second valve means is arranged in the outlet duct.

7. A water-purifying apparatus as set forth in claim 2, characterized in that the T-joint is connected in the inlet duct and has one connection in communication with the interior of the reactor tank, and that the second pump is connected in the inlet duct between the T-joint and the radon-releasing means.

8. A water-purifying apparatus as set forth in claim 7, characterized in that said connection is in communication with the interior of the reactor tank at the bottom thereof.

9. A water-purifying apparatus as set forth in claim 7, characterized in that there is provided a third pump, which is connected in the outlet duct and adapted to pump water to the water consumption system.

* * * * *